United States Patent
Ku et al.

(10) Patent No.: US 8,068,318 B2
(45) Date of Patent: Nov. 29, 2011

(54) APPARATUS FOR GROUND FAULT CURRENT INTERRUPTER WITH OVERALL END-OF-LIFE INDICATION AND SHUTDOWN PROTECTION FUNCTION

(75) Inventors: Ying-Ming Ku, Taoyuan (TW); Yi-Huang Lee, Taoyuan (TW); Chih-Huan Wang, Taoyuan (TW)

(73) Assignee: YFC-Boneagle Electric Co., Ltd., Taoyuan (TW)

( * ) Notice: Subject to any disclaimer, the term of this patent is extended or adjusted under 35 U.S.C. 154(b) by 154 days.

(21) Appl. No.: 12/721,256

(22) Filed: Mar. 10, 2010

(65) Prior Publication Data
US 2011/0222193 A1 Sep. 15, 2011

(51) Int. Cl.
*H02H 3/00* (2006.01)
*H02H 9/08* (2006.01)
(52) U.S. Cl. .............. 361/42; 361/43; 361/44; 361/45; 361/46
(58) Field of Classification Search .............. 361/42
See application file for complete search history.

(56) References Cited

U.S. PATENT DOCUMENTS

| | | | | |
|---|---|---|---|---|
| 2007/0247769 A1* | 10/2007 | Shi | | 361/42 |
| 2008/0007879 A1* | 1/2008 | Zaretsky et al. | | 361/42 |
| 2008/0022153 A1* | 1/2008 | Wang et al. | | 714/30 |
| 2010/0053826 A1* | 3/2010 | Finlay et al. | | 361/42 |

* cited by examiner

*Primary Examiner* — Dharti Patel
(74) *Attorney, Agent, or Firm* — Chun-Ming Shih; HDLS IPR Services

(57) ABSTRACT

An apparatus for ground fault current interrupter with overall end-of-life indication and shutdown protection function includes a first silicon-controlled rectifier, a reverse unit, a test switch unit and a ground fault current interrupter. The ground fault current interrupter includes a second silicon-controlled rectifier, a switch unit, a switch control unit and a rectifier filter unit. When a test current leakage signal is generated, a drive power is provided to the reverse unit, and the input power supply generates a current leakage phenomenon. If the ground fault current interrupter fails, then the second silicon-controlled rectifier will not be triggered, which makes the reverse unit trigger the first silicon-controlled rectifier, such that the rectifier filter unit outputs a DC power flowing through the first silicon-controlled rectifier to interrupt a power supply of the switch control unit. Therefore, the input power supply electrically connected to the switch unit can not deliver any power to the load electrically connected to the switch unit.

9 Claims, 3 Drawing Sheets

APPARATUS FOR GROUND FAULT CURRENT INTERRUPTER WITH OVERALL END-OF-LIFE INDICATION AND SHUTDOWN PROTECTION FUNCTION

BACKGROUND OF THE INVENTION

1. Field of the Invention

The present invention in general relates to an apparatus for ground fault current interrupter, in particular, to an apparatus for ground fault current interrupter with overall end-of-life indication and shutdown protection function.

2. Description of Prior Art

Please refer to FIG. 1, which is an embodiment block diagram of a ground fault current interrupter according to prior arts. The name and working principle of each part are described below (which is applied to a load 50A):

Current leakage sensing circuit 20A: detecting current leakage of electrical equipment.

Control circuit 30A: accepting output signal of the leakage sensing circuit 20A, after a corresponding treatment, controlling on/off of a current interrupter 60A (described later) and off of a current leakage indicator.

Power supply circuit 40A: converting AC power into smooth DC power, which is then supplied to the current leakage sensing circuit 20A, the control circuit 30A and the current interrupter 60A, to make them work properly.

Current interrupter 60A: receiving output signal of the control circuit 30A, and correspondingly controlling connection and interrupt of electrical equipment and power supply.

Test Circuit 70A: capable of testing if the ground fault current interrupter can normally provide current leakage protection to electrical equipment and human body.

Re-set circuit 80A: after the ground fault current interrupter experiences gate-off due to current leakage fault or when the ground fault current interrupter is tested, the operation of the re-set circuit 80A can quickly re-close the ground fault current interrupter.

The aforementioned ground fault current interrupter according to prior arts can cut off AC power during the formation of current leakage, such that electrical equipment can prevent damage and ensure the safety of users. However, if its internal circuit is damaged (for example, silicon-controlled rectifier or integrated circuits or the current leakage sensing circuit 20A or the current interrupter 60A is damaged), it will be unable to achieve a cut off mission for the AC power during the formation of current leakage. Therefore, if we can increase operational normality of each important circuit in the ground fault current interrupter of prior arts under a condition that the increased overall protection circuit and warning function won't affect the own function of the ground fault current interrupter, the practicability of the ground fault current interrupter will be enhanced significantly.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

To improve the shortcomings of the prior arts, first of all, the invention is to provide an apparatus for ground fault current interrupter with overall end-of-life indication and shutdown protection function to test if the ground fault current interrupter is operated normally.

To improve the shortcomings of the prior arts, secondly, the invention is to provide an apparatus for ground fault current interrupter with overall end-of-life indication and shutdown protection function to send out a warning when the ground fault current interrupter is operated abnormally.

To achieve the above-mentioned objectives of the invention, thirdly, the invention is to provide an apparatus for ground fault current interrupter with overall end-of-life indication and shutdown protection function, applied to an input power supply and a load, including a first silicon-controlled rectifier; a reverse unit, which is electrically connected to a gate of the first silicon-controlled rectifier; a test switch unit, which is electrically connected to the reverse unit, the input power supply and the load; and a ground fault current interrupter, which is electrically connected to the reverse unit, the input power supply and the load. The ground fault current interrupter includes: a second silicon-controlled rectifier, which is electrically connected to the reverse unit; a switch unit, which is electrically connected to the input power supply and the load; a switch control unit, which is electrically connected to the switch unit, the first silicon-controlled rectifier and the second silicon-controlled rectifier; and a rectifier filter unit, which is electrically connected to the input power supply, the switch unit, the switch control unit, the first silicon-controlled rectifier and the second silicon-controlled rectifier. When a test current leakage signal is generated, a life detect circuit is triggered. If the ground fault current interrupter fails, then the second silicon-controlled rectifier will not be triggered, making the reverse unit output a trigger signal to trigger the first silicon-controlled rectifier, which makes the rectifier filter unit output a DC power flowing through the first silicon-controlled rectifier to interrupt a power supply of the switch control unit, such that the input power can not be delivered to the load.

To achieve the above-mentioned objectives of the invention, fourthly, the invention is to provide an apparatus for ground fault current interrupter with overall end-of-life indication and shutdown protection function, applied to an input power supply and a load, including a first silicon-controlled rectifier; a reverse unit, which is electrically connected to a gate of the first silicon-controlled rectifier; a test switch unit, which is electrically connected to the reverse unit, the input power supply and the load; a warning unit, which is electrically connected to the first silicon-controlled rectifier; and a ground fault current interrupter, which is electrically connected to the reverse unit, the input power supply and the load. The ground fault current interrupter includes: a second silicon-controlled rectifier, which is electrically connected to the reverse unit; a switch unit, which is electrically connected to the input power supply and the load; a switch control unit, which is electrically connected to the switch unit, the first silicon-controlled rectifier and the second silicon-controlled rectifier; and a rectifier filter unit, which is electrically connected to the input power supply, the switch unit, the switch control unit, the first silicon-controlled rectifier and the second silicon-controlled rectifier. When a test current leakage signal is generated, a drive power is provided to the reverse unit. When the input power supply generates a current leakage phenomenon, and if the ground fault current interrupter fails, then the second silicon-controlled rectifier will not be triggered, making the reverse unit output a trigger signal to trigger the first silicon-controlled rectifier, which makes the warning unit send out a warning.

BRIEF DESCRIPTION OF DRAWING

The features of the invention believed to be novel are set forth with particularity in the appended claims. The invention itself, however, may be best understood by reference to the following detailed description, which describes an embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, not used to limit its executing scope. Any equivalent variation and modification made according to appended claims is all covered by the claims claimed by the present invention.

Figure 1:
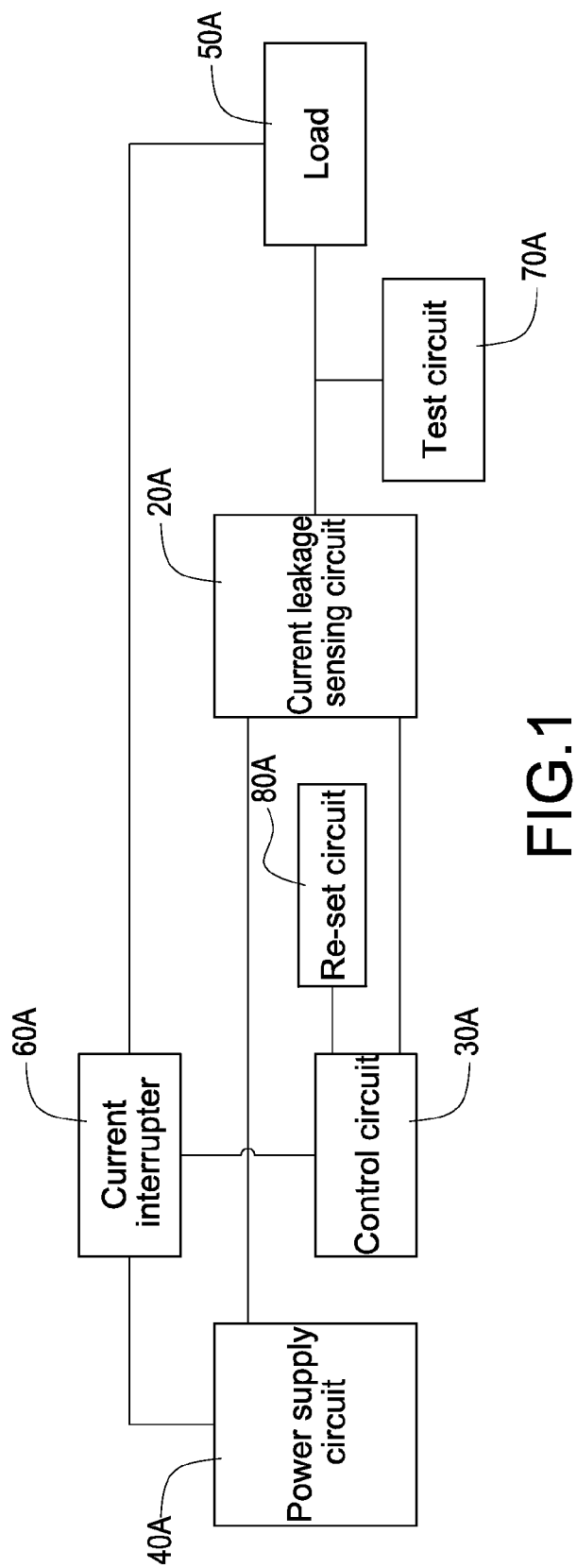
FIG. 1 is a block diagram of a ground fault current interrupter according to an embodiment of prior arts.
Figure 2:
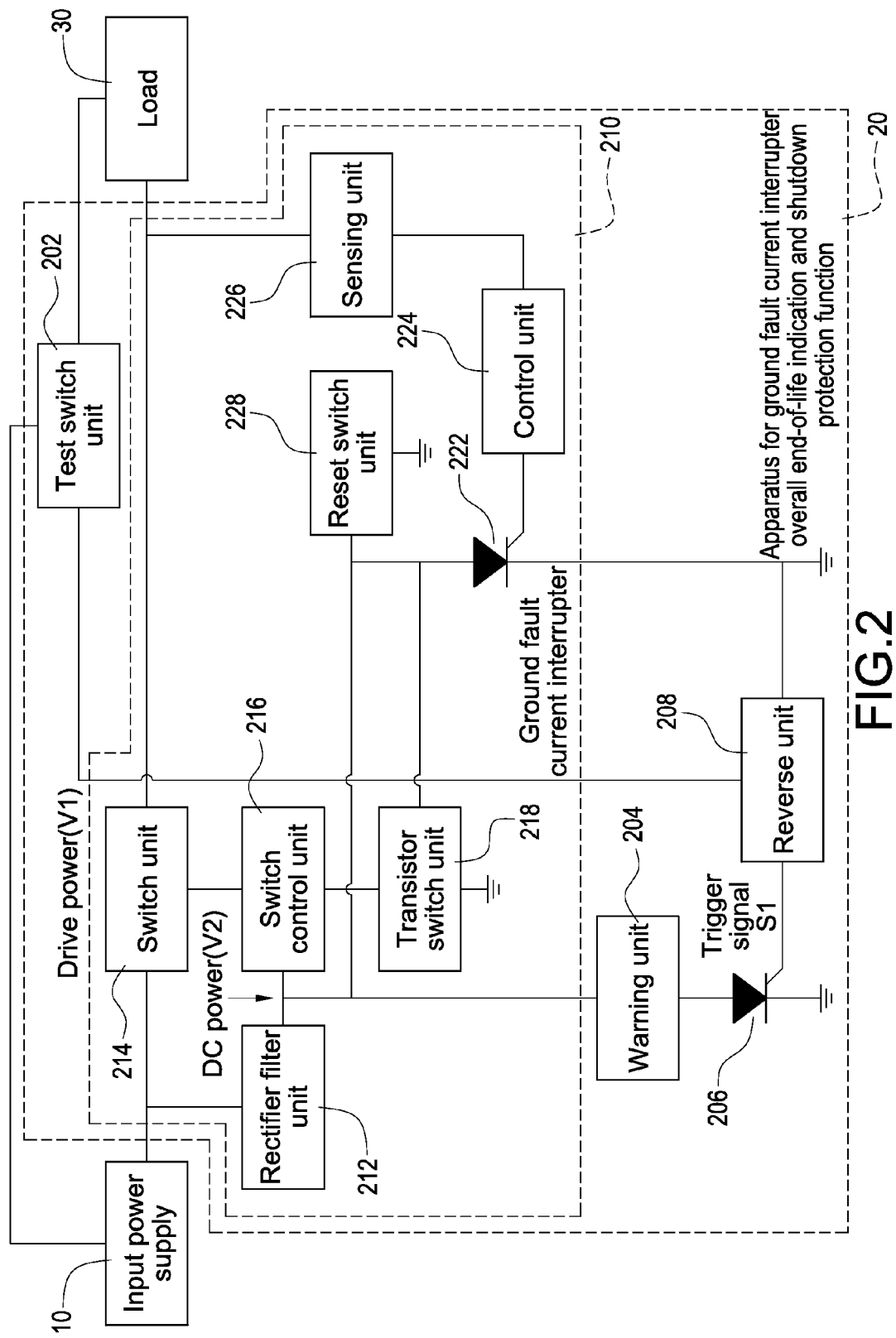
FIG. 2 is a block diagram of an apparatus for ground fault current interrupter with overall end-of-life indication and shutdown protection function according to the present invention.

Please refer to FIG. 2, which is an apparatus for ground fault current interrupter with overall end-of-life indication and shutdown protection function according to the present invention. The apparatus 20 for ground fault current interrupter with overall end-of-life indication and shutdown protection function according to the present invention is applied to an input power supply 10 and a load 30. The apparatus 20 for ground fault current interrupter with overall end-of-life indication and shutdown protection function 20 includes a test switch unit 202, a warning unit 204, a first silicon-controlled rectifier 206, a reverse unit 208 and a ground fault current interrupter 210. The ground fault current interrupter 210 includes a rectifier filter unit 212, a switch unit 214, a switch control unit 216, a transistor switching unit 218, a second silicon-controlled rectifier 222, a control unit 224, a sensing unit 226 and a re-set switch unit 228.

The control unit 224 is electrically connected to the gate of the second silicon-controlled rectifier 222 and the sensing unit 226; the switch unit 214 is electrically connected to the input power supply 10, the load 30, the sensing unit 226, the switch control unit 216 and the rectifier filter unit 212; the switch control unit 216 is electrically connected to the switch unit 214, the rectifier filter unit 212, the transistor switching unit 218, the re-set switch unit 228, the second silicon-controlled rectifier 222 and the warning unit 204; the transistor switching unit 218 is electrically connected to the switch control unit 216; the test switch unit 202 is electrically connected to the input power supply 10, the load 30 and the reverse unit 208; the reverse unit 208 is electrically connected to the test switch unit 202, the second silicon-controlled rectifier 222 and the gate of the first silicon-controlled rectifier 206; the first silicon-controlled rectifier 206 is further electrically connected to the warning unit 204.

The action principle of the ground fault current interrupter 210 is same as that of prior arts, so repetitive description is not presented herein. The following will detail the apparatus 20 for ground fault current interrupter with overall end-of-life indication and shutdown protection function according to the present invention how to test if the internal circuit of the ground fault current interrupter 210 is normally operated.

When a current leakage test signal is generated (by pressing the test switch unit 202, a drive power V1 can be provided to the reverse unit 208). If the ground fault current interrupter 210 faults, the second silicon-controlled rectifier 222 will not be triggered, making the reverse unit 208 output a trigger signal S1 to trigger the first silicon-controlled rectifier 206 to be conducted. The rectifier output filter unit 212 outputs a DC power V2 flowing through the warning unit 204 and the first silicon-controlled rectifier 206 (because the internal resistance of the warning unit 204 or the first silicon-controlled rectifier 206 is much smaller than the switch control unit 216), then the switch control unit 216 will not be driven (because the switch control unit 216 fails to meet the rated voltage). The switch circuit unit 214 is shutdown, making the input power supply 10 unable to deliver any power to the load 30, and the warning unit 204 issues a warning, which indicates that the ground fault current interrupter 210 has been faulted and can not be used. At this time, because the first silicon-controlled rectifier 206 is permanently conducted after being triggered, the user can not reset it, and because the input power supply 10 can never be passed to the load 30, the user is forced to renew the apparatus 20 for ground fault current interrupter with overall end-of-life indication and shutdown protection function, which can avoid the user from forgetting the replacement.

In this case, the warning unit 204 can be a light-emitting diode (emitting light as a warning), or a buzzer (making sound as a warning); the reverse unit 208 can be a reverse device.

When the current leakage test signal is generated, and if the operation of ground fault current interrupter 210 is normal (as described in prior arts), then the reverse unit 208 will not trigger the first silicon-controlled rectifier 206 to be conducted, and the warning unit 204 will not issue any warning; this means that the ground fault current interrupter 210 is functioning properly. At this time, as previously described in the prior arts, the user has to press the re-set switch unit 228 to close the second silicon-controlled rectifier 222.

Figure 3:
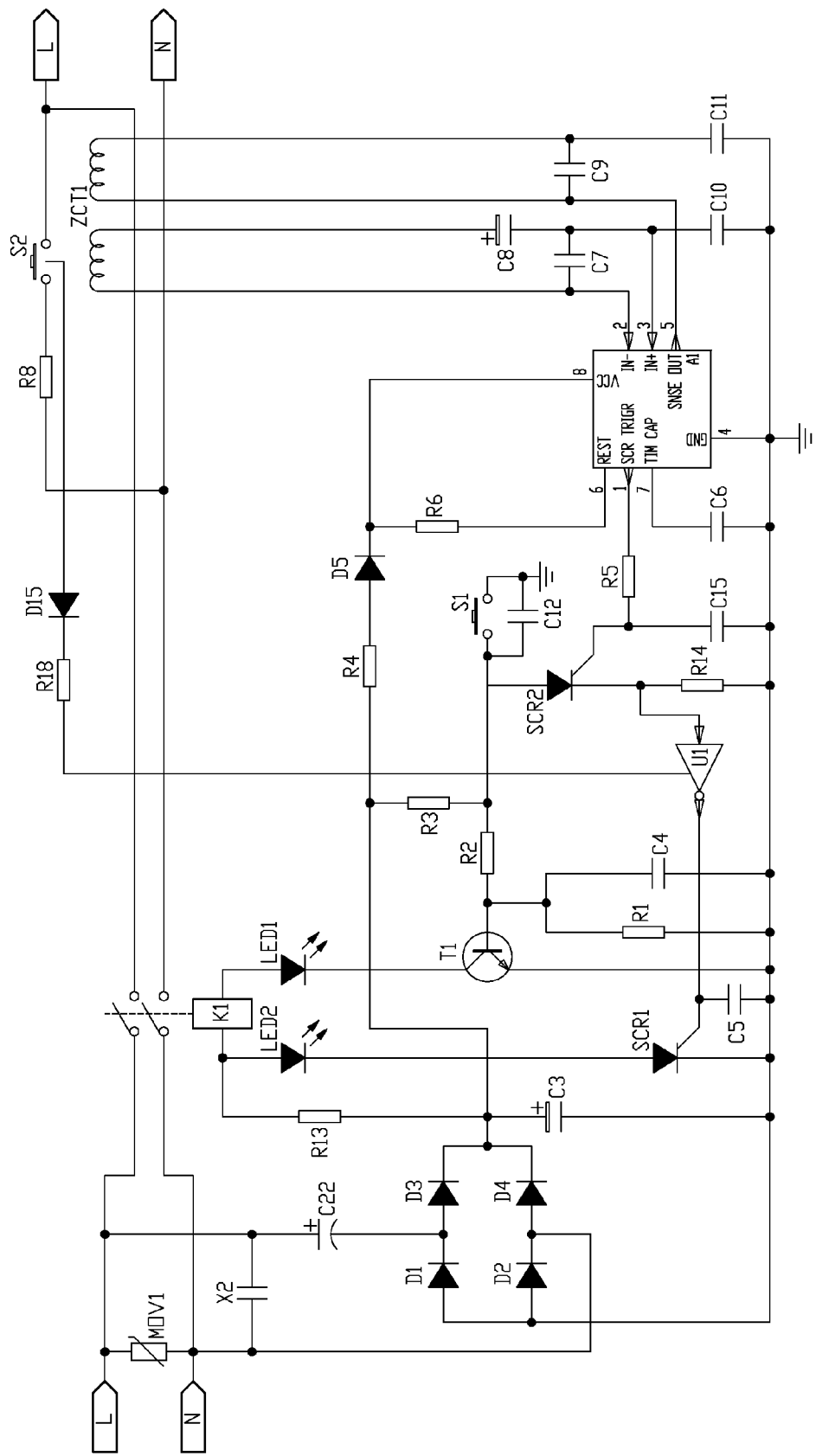
FIG. 3 is a circuit diagram of an apparatus for ground fault current interrupter with overall end-of-life indication and shutdown protection function according to an embodiment of the present invention.

Please refer to FIG. 3, which is a circuit diagram of an apparatus for ground fault current interrupter with overall end-of-life indication and shutdown protection function according to an embodiment of the present invention.

The apparatus 20 for ground fault current interrupter with overall end-of-life indication and shutdown protection function according to the present invention can also have a warning unit 204 only sending out a warning but without any current interruption. The implementation methodology is that instead connecting the above of the warning unit 204 in FIG. 2 to the switch control unit 216, a connection is made to a power source that can supply power to the warning unit 204. For example, a connection is made to the right of resistance R4 in FIG. 3.

The apparatus 20 for ground fault current interrupter with overall end-of-life indication and shutdown protection function according to the present invention has low cost and simple circuit. When the operation of any important circuit in the ground fault current interrupter 20 fails, the user will be protected by automatically cutting off the power and the user will be also informed by simultaneously sending out a warning. When the first silicon-controlled rectifier 206 is permanently conducted after being triggered, the input power supply 10 can never be passed to the load 30, and the apparatus 20 for ground fault current interrupter with overall end-of-life indication and shutdown protection function can not be reset by the user either, so the user will be forced to renew the apparatus 20 for ground fault current interrupter with overall end-of-life indication and shutdown protection function to keep the user from forgetting the replacement, such that a security on usage is further ensured.

Therefore, through the constitution of aforementioned assemblies, an apparatus for ground fault current interrupter with overall end-of-life indication and shutdown protection function according to the present invention is thus obtained.

Summarizing aforementioned description, the apparatus for ground fault current interrupter with overall end-of-life indication and shutdown protection function according to the present invention is an indispensable apparatus and design for electrical equipment industry indeed, which may positively reach the expected usage objective for solving the drawbacks of the prior arts, and which extremely possesses the innovation and progressiveness to completely fulfill the applying merits of a new type patent, according to which the invention is thereby applied. Please examine the application carefully and grant it as a formal patent for protecting the rights of the inventor.

However, the aforementioned description is only a preferable embodiment according to the present invention, not used to limit the patent scope of the invention, so equivalently structural variation made to the contents of the present invention, for example, description and drawings, is all covered by the claims claimed thereinafter.

What is claimed is:

1. An apparatus for ground fault current interrupter with overall end-of-life indication and shutdown protection, applied to an input power supply and a load, including:
    a first silicon-controlled rectifier;
    a reverse unit, which is electrically connected to a gate of the first silicon-controlled rectifier;
    a test switch unit, which is electrically connected to the reverse unit, the input power supply and the load; and
    a ground fault current interrupter, which is electrically connected to the reverse unit, the input power supply and the load,
    wherein the ground fault current interrupter includes:
    a second silicon-controlled rectifier, which is electrically connected to the reverse unit;
    a switch unit, which is electrically connected to the input power supply and the load;
    a switch control unit, which is electrically connected to the switch unit, the first silicon-controlled rectifier and the second silicon-controlled rectifier; and
    a rectifier filter unit, which is electrically connected to the input power supply, the switch unit, the switch control unit, the first silicon-controlled rectifier and the second silicon-controlled rectifier,
    when a test current leakage signal is generated, a drive power is provided to the reverse unit, and when the input power supply generates a current leakage phenomenon and if the ground fault current interrupter fails, then the second silicon-controlled rectifier will not be triggered, making the reverse unit output a trigger signal to trigger the first silicon-controlled rectifier, which makes the rectifier filter unit output a DC power flowing through the first silicon-controlled rectifier to interrupt a power supply of the switch control unit, such that the input power can not be delivered to the load.

2. The apparatus for ground fault current interrupter with overall end-of-life indication and shutdown protection according to claim 1, further including a warning unit, which is electrically connected to the first silicon-controlled rectifier.

3. The apparatus for ground fault current interrupter with overall end-of-life indication and shutdown protection according to claim 2, wherein the warning unit is a light-emitting diode or a buzzer.

4. The apparatus for ground fault current interrupter with overall end-of-life indication and shutdown protection according to claim 2, wherein the ground fault current interrupter further includes:
    a control unit, which is electrically connected to a gate of the second silicon-controlled rectifier;
    a sensing unit, which is electrically connected to the control unit, the switch unit and the load;
    a transistor switching unit, which is electrically connected to the switch control unit; and
    a reset switch unit, which is electrically connected to the second silicon-controlled rectifier, the rectifier filter unit, the warning unit and the switch control unit.

5. The apparatus for ground fault current interrupter with overall end-of-life indication and shutdown protection according to claim 1, wherein the reverse unit is a reverser.

6. An apparatus for ground fault current interrupter with overall end-of-life indication and shutdown protection, applied to an input power supply and a load, including:
    a first silicon-controlled rectifier;
    a reverse unit, which is electrically connected to a gate of the first silicon-controlled rectifier;
    a test switch unit, which is electrically connected to the reverse unit, the input power supply and the load;
    a warning unit, which is electrically connected to the first silicon-controlled rectifier; and
    a ground fault current interrupter, which is electrically connected to the reverse unit, the input power supply and the load,
    wherein the ground fault current interrupter includes:
    a second silicon-controlled rectifier, which is electrically connected to the reverse unit;
    a switch unit, which is electrically connected to the input power supply and the load;
    a switch control unit, which is electrically connected to the switch unit, the first silicon-controlled rectifier and the second silicon-controlled rectifier; and
    a rectifier filter unit, which is electrically connected to the input power supply, the switch unit, the switch control unit, the first silicon-controlled rectifier and the second silicon-controlled rectifier,
    when a test current leakage signal is generated, a drive power is provided to the reverse unit, and when the input power supply generates a current leakage phenomenon and if the ground fault current interrupter fails, then the second silicon-controlled rectifier will not be triggered, making the reverse unit output a trigger signal to trigger the first silicon-controlled rectifier, which makes the warning unit send out a warning.

7. The apparatus for ground fault current interrupter with overall end-of-life indication and shutdown protection according to claim 6, wherein the warning unit is a light-emitting diode or a buzzer.

8. The apparatus for ground fault current interrupter with overall end-of-life indication and shutdown protection according to claim 6, wherein the ground fault current interrupter further includes:

a control unit, which is electrically connected to a gate of the second silicon-controlled rectifier;

a sensing unit, which is electrically connected to the control unit, the switch unit and the load;

a transistor switching unit, which is electrically connected to the switch control unit; and a reset switch unit, which is electrically connected to the second silicon-controlled rectifier, the rectifier filter unit, the warning unit and the switch control unit.

9. The apparatus for ground fault current interrupter with overall end-of-life indication and shutdown protection according to claim 6, wherein the reverse unit is a reverser.

* * * * *